(12) United States Patent
Williams

(10) Patent No.: US 12,087,259 B2
(45) Date of Patent: Sep. 10, 2024

(54) SYSTEMS, DEVICES, AND METHODS FOR ASSIGNING MOOD LABELS TO MUSICAL COMPOSITIONS

(71) Applicant: Obeebo Labs Ltd., Waterloo (CA)

(72) Inventor: Colin P. Williams, Half Moon Bay, CA (US)

(73) Assignee: Obeebo Labs Ltd., Waterloo (CA)

( * ) Notice: Subject to any disclaimer, the term of this patent is extended or adjusted under 35 U.S.C. 154(b) by 730 days.

(21) Appl. No.: 17/163,282

(22) Filed: Jan. 29, 2021

(65) Prior Publication Data

US 2021/0241731 A1    Aug. 5, 2021

Related U.S. Application Data

(60) Provisional application No. 62/968,963, filed on Jan. 31, 2020.

(51) Int. Cl.
| | | |
|---|---|---|
| *G10H 1/00* | (2006.01) | |
| *G06F 16/65* | (2019.01) | |
| *G06Q 40/12* | (2023.01) | |
| *G06Q 50/18* | (2012.01) | |
| *G10H 7/08* | (2006.01) | |

(52) U.S. Cl.
CPC ........... *G10H 1/0025* (2013.01); *G06F 16/65* (2019.01); *G06Q 40/12* (2013.12); *G06Q 50/184* (2013.01); *G10H 1/0008* (2013.01); *G10H 1/0041* (2013.01); *G10H 7/08* (2013.01); *G10H 2210/031* (2013.01); *G10H 2210/056* (2013.01); *G10H 2210/061* (2013.01); *G10H 2210/071* (2013.01); *G10H 2210/111* (2013.01); *G10H 2210/131* (2013.01); *G10H 2210/145* (2013.01); *G10H 2250/005* (2013.01); *G10H 2250/215* (2013.01)

(58) Field of Classification Search
CPC .. G10H 1/0025; G10H 1/0008; G10H 1/0041; G10H 7/08; G10H 2210/031; G10H 2210/056; G10H 2210/061; G10H 2210/071; G10H 2210/111; G10H 2210/131; G10H 2250/005; G10H 2250/215; G10G 2210/145; G06Q 40/12; G06Q 50/184; G06F 16/65
USPC .......................................................... 84/609
See application file for complete search history.

(56) References Cited

U.S. PATENT DOCUMENTS

| | | | | |
|---|---|---|---|---|
| 5,693,902 A | * | 12/1997 | Hufford | ................... G06F 16/68 |
| | | | | 84/610 |
| 5,898,119 A | * | 4/1999 | Tseng | ..................... G10H 1/361 |
| | | | | 84/610 |

(Continued)

FOREIGN PATENT DOCUMENTS

| | | | | |
|---|---|---|---|---|
| CN | 101142622 A | * | 3/2008 | ........... G10H 1/0008 |
| CN | 1985302 B | * | 12/2010 | ............. G06F 16/64 |

(Continued)

*Primary Examiner* — Christina M Schreiber
(74) *Attorney, Agent, or Firm* — Thomas Mahon

(57) ABSTRACT

Computer-based systems, devices, and methods for assigning mood labels to musical compositions are described. A mood classifier is trained based on mood-labeled musically-coherent segments of musical compositions and subsequently applied to automatically assign mood labels to musically-coherent segments of musical compositions. In both cases, the musically-coherent segments are generated using automated segmentation algorithms.

18 Claims, 6 Drawing Sheets

(56) References Cited

U.S. PATENT DOCUMENTS

| | | | | |
|---|---|---|---|---|
| 5,980,262 A * | 11/1999 | Tseng | ............... | G10H 1/368 |
| | | | | 84/610 |
| 7,485,796 B2 * | 2/2009 | Myeong | ............... | G10H 1/0091 |
| | | | | 381/310 |
| 9,223,830 B1 * | 12/2015 | Dzik | ............... | G06F 40/103 |
| 10,629,176 B1 * | 4/2020 | Williams | ............... | G10H 1/0041 |
| 10,726,874 B1 * | 7/2020 | Smith | ............... | G10H 1/366 |
| 11,024,274 B1 * | 6/2021 | Williams | ............... | G10H 1/0025 |
| 2005/0158037 A1 * | 7/2005 | Okabayashi | ....... | H04N 1/32112 |
| | | | | 386/353 |
| 2006/0010167 A1 * | 1/2006 | Grace | ............... | H04L 67/1095 |
| 2007/0157795 A1 * | 7/2007 | Hung | ............... | G10H 1/0008 |
| | | | | 84/600 |
| 2007/0169613 A1 * | 7/2007 | Kim | ............... | G11B 27/105 |
| | | | | 84/609 |
| 2007/0250901 A1 * | 10/2007 | McIntire | ............... | H04N 21/47815 |
| | | | | 348/E7.071 |
| 2009/0031882 A1 * | 2/2009 | Kemp | ............... | G10H 1/0008 |
| | | | | 84/609 |
| 2010/0004926 A1 * | 1/2010 | Neoran | ............... | G10L 25/48 |
| | | | | 704/201 |
| 2012/0102066 A1 * | 4/2012 | Eronen | ............... | G06F 16/683 |
| | | | | 707/769 |
| 2015/0220633 A1 * | 8/2015 | Fuzell-Casey | ......... | G06Q 10/00 |
| | | | | 707/748 |
| 2016/0162565 A1 * | 6/2016 | Jung | ............... | G06F 16/639 |
| | | | | 707/737 |
| 2020/0074982 A1 * | 3/2020 | McCallum | ............... | G10L 15/04 |
| 2020/0402488 A1 * | 12/2020 | Williams | ............... | G10H 1/0041 |
| 2021/0225408 A1 * | 7/2021 | Dong | ............... | G10L 25/54 |
| 2021/0241731 A1 * | 8/2021 | Williams | ............... | G06Q 50/184 |
| 2021/0241735 A1 * | 8/2021 | Williams | ............... | G10H 1/0041 |
| 2021/0407477 A1 * | 12/2021 | Williams | ............... | G10H 1/368 |

FOREIGN PATENT DOCUMENTS

| | | | | |
|---|---|---|---|---|
| CN | 107106063 A | * | 8/2017 | ............... A61B 5/04 |
| DE | 102022131735 A1 | * | 6/2023 | ............ B60K 35/00 |
| FR | 3039349 A1 | * | 1/2017 | |
| KR | 20070048484 A | * | 5/2007 | |
| KR | 20110121830 A | * | 11/2011 | |
| WO | WO-2021115311 A1 | * | 6/2021 | |

* cited by examiner

SYSTEMS, DEVICES, AND METHODS FOR ASSIGNING MOOD LABELS TO MUSICAL COMPOSITIONS

CROSS-REFERENCE TO RELATED APPLICATION

This application claims the benefit of U.S. Provisional Patent Application Ser. No. 62/968,963, filed Jan. 31, 2020, titled "Systems, Devices, And Methods for Computer-Generated Musical Compositions", the content of which is incorporated herein in its entirety by reference.

TECHNICAL FIELD

The present systems, devices, and methods generally relate to digital processing of musical compositions, and particularly relate to automated algorithms for assigning mood labels to musical compositions.

BACKGROUND

Description of the Related Art

Composing Musical Compositions

A musical composition may be characterized by sequences of sequential, simultaneous, and/or overlapping notes that are partitioned into one or more tracks. Starting with an original musical composition, a new musical composition or "variation" can be composed by manipulating the "elements" (e.g., notes, bars, tracks, arrangement, etc.) of the original composition. As examples, different notes may be played at the original times, the original notes may be played at different times, and/or different notes may be played at different times. Further refinements can be made based on many other factors, such as changes in musical key and scale, different choices of chords, different choices of instruments, different orchestration, changes in tempo, the imposition of various audio effects, changes to the sound levels in the mix, and so on.

In order to compose a new musical composition (or variation) based on an original or previous musical composition, it is typically helpful to have a clear characterization of the elements of the original musical composition. In addition to notes, bars, tracks, and arrangements, "segments" are also important elements of a musical composition. In this context, the term "segment" (or "musical segment") is used to refer to a particular sequence of bars (i.e., a subset of serially-adjacent bars) that represents or corresponds to a particular section or portion of a musical composition. A musical segment may include, for example, an intro, a verse, a pre-chorus, a chorus, a bridge, a middle8, a solo, or an outro. The section or portion of a musical composition that corresponds to a "segment" may be defined, for example, by strict rules of musical theory and/or based on the sound or theme of the musical composition.

BRIEF SUMMARY

A computer-implemented method of labeling a musical composition with at least one mood label may be summarized as including: segmenting the musical composition into a sequence of musically-coherent segments, the sequence of musically-coherent segments including at least two musically-coherent segments; and employing a mood classifier to assign at least one respective mood label to each respective musically-coherent segment. The mood classifier may include processor-executable instructions and/or data stored in a non-transitory processor-readable storage medium that, when executed by at least one processor, cause the at least one processor to assign at least one respective mood label to each respective musically-coherent segment of a musical composition. Employing a mood classifier to assign at least one respective mood label to each respective musically-coherent segment may include executing, by at least one processor, the processor-executable instructions and/or data stored in a non-transitory processor-readable storage medium communicatively coupled to the at least one processor to cause the at least one processor to assign at least one respective mood label to each respective musically-coherent segment. The mood classifier may include processor-executable instructions and/or data stored in a non-transitory processor-readable storage medium, wherein the processor-executable instructions and/or data are based at least in part on training data comprising a library of mood-labeled musically-coherent segments.

The method may further include labelling the musical composition with a least one mood label, the at least one mood label with which the musical composition is labelled corresponding to at least one mood label assigned to at least one musically-coherent segment of the musical composition. Labeling the musical composition with at least one mood label may include labeling the musical composition with all distinct mood labels assigned to all of the musically-coherent segments of the musical composition. Alternatively, labeling the musical composition with at least one mood label may include labeling the musical composition with a subset of all distinct mood labels assigned to all of the musically-coherent segments of the musical composition, the subset consisting of only X most frequently occurring distinct mood labels among all distinct mood labels assigned to all of the musically-coherent segments of the musical composition, where X is an integer and X≥1. Alternatively, labeling the musical composition with at least one mood label may include combining at least two of the respective mood labels assigned to respective ones of at least two of the musically-coherent segments into at least one subsuming mood label and labelling the musical composition with the at least one subsuming mood label.

Segmenting the musical composition into a sequence of musically-coherent segments may include segmenting the musical composition into at least one musically-coherent segment selected from a group consisting of: an intro, a verse, a chorus, a solo, a middle8, a pre-chorus, a bridge, and an outro. Employing a mood classifier to assign at least one respective mood label to each respective musically-coherent segment may include employing the mood classifier to assign, to at least one musically-coherent segment, at least one mood label selected from a group consisting of: Energetic, Heroic, Happy, Relaxed, Calm, Dreamy, Awed, Romantic, Sensual, Sexual, Wistful, Sad, Melancholic, Depressed, Anxious, Fearful, Angry, Hateful, Restless, Whimsical, Amusing, Annoying, Tense, Beautiful, Relaxing, Serene, Energizing, Erotic, Desirous, Indignant, Defiant, Joyful, Cheerful, Depressing, Scary, Fearful, and/or Triumphant.

A mood classifier may be summarized as including processor-executable instructions and/or data stored in a non-transitory processor-readable storage medium, wherein when executed by at least one processor communicatively coupled to the non-transitory processor-readable storage medium, the mood classifier assigns at least one mood label to at least a portion of a musical composition, and wherein the processor-executable instructions and/or data are based at least in part on training data comprising a library of mood-labeled musically-coherent segments. The musical composition may include a sequence of musically-coherent segments and, when executed by at least one processor communicatively coupled to the non-transitory processor-readable storage medium, the mood classifier may assign at least one respective mood label to each musically-coherent segment in the musical composition.

The library of mood-labeled musically-coherent segments may be generated from a library of musical compositions by a process that, for each musical composition in the library of musical compositions: segments the musical composition into musically-coherent segments; and assigns at least one mood label to each musically-coherent segment. The library of mood-labeled musically-coherent segments may be generated from a library of musical compositions by a process that, for each musical composition in the library of musical compositions: segments the musical composition into musically-coherent segments; and assigns only one respective mood label to each musically-coherent segment.

The library of musically-coherent segments may include at least one musically-coherent segment selected from a group consisting of: an intro, a verse, a chorus, a solo, a middle8, a pre-chorus, a bridge, and an outro. The at least one mood label may be selected from a group consisting of: Energetic, Heroic, Happy, Relaxed, Calm, Dreamy, Awed, Romantic, Sensual, Sexual, Wistful, Sad, Melancholic, Depressed, Anxious, Fearful, Angry, Hateful, Restless, Whimsical, Amusing, Annoying, Tense, Beautiful, Relaxing, Serene, Energizing, Erotic, Desirous, Indignant, Defiant, Joyful, Cheerful, Depressing, Scary, Fearful, and/or Triumphant.

A computer-implemented method of training a mood classifier to assign at least one mood label to a musical composition may be summarized as including: generating mood-labeled musically-coherent segments, wherein generating mood-labeled musically-coherent segments includes, for a set of musical compositions: segmenting each musical composition into a sequence of musically-coherent segments; and assigning at least one mood label to each musically-coherent segment; and training the mood classifier based on the mood-labeled musically-coherent segments. Assigning at least one mood label to each musically-coherent segment may include receiving, by at least one processor, an assignment of at least one mood label for at least one musically-coherent segment. Assigning at least one mood label to each musically-coherent segment may include assigning only one respective mood label to each musically-coherent segment.

Segmenting each musical composition into a sequence of musically-coherent segments may include segmenting each musical composition into at least one musically-coherent segment selected from a group consisting of: an intro, a verse, a chorus, a solo, a middle8, a pre-chorus, a bridge, and an outro. Assigning at least one mood label to each musically-coherent segment may include assigning, to each musically-coherent segment, at least one mood label selected from a group consisting of: Energetic, Heroic, Happy, Relaxed, Calm, Dreamy, Awed, Romantic, Sensual, Sexual, Wistful, Sad, Melancholic, Depressed, Anxious, Fearful, Angry, Hateful, Restless, Whimsical, Amusing, Annoying, Tense, Beautiful, Relaxing, Serene, Energizing, Erotic, Desirous, Indignant, Defiant, Joyful, Cheerful, Depressing, Scary, Fearful, and/or Triumphant.

Each mood-labeled musically-coherent segment may include a respective set of digital data objects, and training the mood classifier based on the mood-labeled musically-coherent segments may include extracting training features from parameters specified in the digital data objects. Either instead of or in combination with the foregoing, training the mood classifier based on the mood-labeled musically-coherent segments may include, for each mood-labeled musically-coherent segment, constructing a respective audio waveform and extracting training features from properties of the audio waveform.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
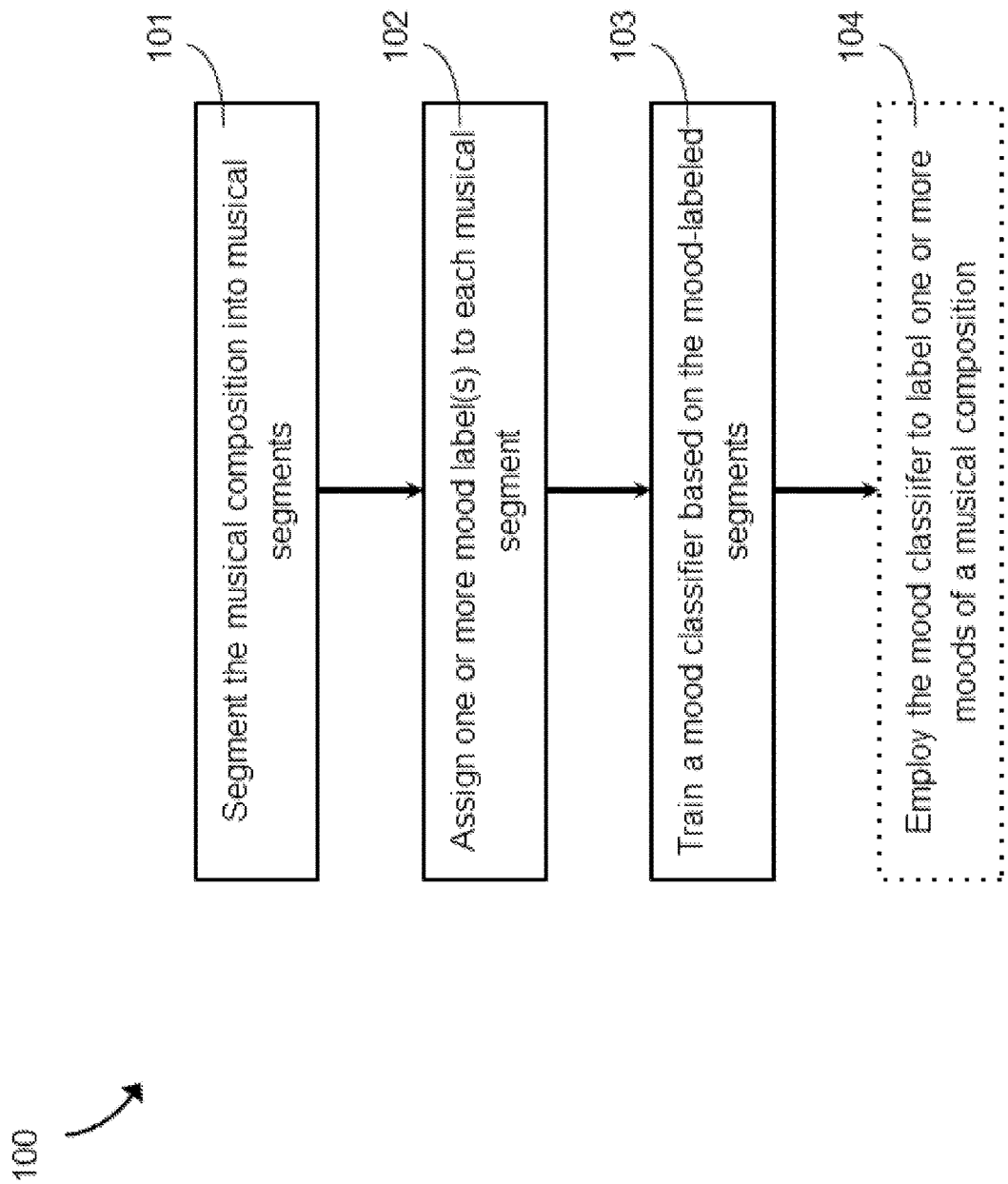
FIG. 1 is a flow diagram showing an exemplary computer-implemented method of training (and, optionally, employing) a mood classifier in accordance with the present systems, devices, and methods.

The following description sets forth specific details in order to illustrate and provide an understanding of the various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The various embodiments described herein provide computer-based systems, devices, and methods for automatically classifying the mood(s) exhibited or evoked by musical compositions. Machine learning techniques are used to train a mood classifier that is subsequently used to automatically apply or assign mood labels to musical compositions. Advantageously, both the training and the application of the mood classifier employs automated systems and methods that segment musical compositions into musically-coherent segments.

Throughout this specification and the appended claims, the term "mood" is sued in a general sense to refer to the mood, feeling, emotion, and/or ambiance that may be exhibited or evoked by a musical composition and/or felt or sensed by a listener. Thus, throughout this specification and the appended claims, the assignment of "mood labels" is generally used to be inclusive of labels representing mood, feeling, and/or emotion.

Systems, devices, and methods for encoding musical compositions in hierarchical data structures of the form Music[Segments{ }, barsPerSegment{ }] are described in U.S. Pat. No. 10,629,176, filed Jun. 21, 2019 and entitled "Systems, Devices, and Methods for Digital Representations of Music," which is incorporated by reference herein in its entirety.

Systems, devices, and methods for automatically identifying the musical segments of a musical composition and which can facilitate encoding musical compositions (or even simply undifferentiated sequences of musical bars) into the Music[Segments{ }, barsPerSegment{ }] form described above are described in U.S. patent application Ser. No. 16/775,241, filed Jan. 28, 2020 and entitled "Systems, Devices, and Methods for Segmenting a Musical Composition into Musical Segments," which is incorporated herein by reference in its entirety.

Systems, devices, and methods for identifying harmonic structure in digital data structures and for mapping the Music[Segments{ }, barsPerSegment{ }] data structure into an isomorphic HarmonicStructure[Segments{ }, harmonicSequencePerSegment{ }] data structure are described in US Patent Publication No. 2020-0402488, filed Jan. 28, 2020 and entitled "Systems, Devices, and Methods for Harmonic Structure in Digital Representations of Music," which is incorporated herein by reference in its entirety.

Throughout this specification and the appended claims, reference is often made to a "data object." Unless the specific context requires otherwise, the term "data object" is used herein to refer to a collection or set of data that is combined or amalgamated into a discretely addressable object. A data object may exist in the source code, object code, computer code, and/or program code of a computing environment where it is defined, interpreted, and manipulated, and a data object may have an analog or physical counterpart in the non-transitory processor-readable storage medium where it is stored and called or operated upon. In this case, "encoding" a component of a musical composition in a data object may include writing, by at least one processor, the component to the data object in the non-transitory processor-readable storage medium and/or forming, by at least one processor, the component(s) in the data object stored in the non-transitory processor-readable storage medium. One data object may include (e.g., contain, encompass, reference, or invoke) one or more additional data object(s).

Throughout this specification and the appended claims, unless the specific context requires otherwise the general term "data object" is used to refer to any (either individually or in multiplicity) of the different types of data objects that are used to encode digital music, including but not limited to those that are encoded (or may be encoded) in a Music [Segments{ }, barsPerSegment{ }] data structure and/or in a HarmonicStructure[Segments{ }, harmonicSequencePerSegment{ }] data structure, such as a bar data object, a track data object, a segment data object, and/or a Music [ ] data object. Thus, unless the specific context requires otherwise, reference to a note variation being applied to or within a "data object" is generally applicable to all such data object types.

The various embodiments described herein include systems, devices, and methods for automatically assigning or otherwise associating one or more mood labels (e.g., happy, sad, energetic, angry, contemplative, meditative, serene, peaceful, joyous, etc.) to or with a musical composition. In the industry today, automated mood labeling is typically inconsistent and unreliable. The present systems, devices, and methods recognize that a given musical composition may include multiple different moods at different points throughout its duration, and modern mood labeling techniques are typically flawed because, at least in part, modern mood labeling classifiers are typically built by cutting uniform samples out of musical compositions and soliciting mood labels from human users. In other words, the training set that is typically used to train a modern mood classifier is typically based on arbitrary snippets of music without any regard to musical structure or coherence. This can lead to inconsistent and unreliable classification results because, as described above, mood may vary throughout a musical composition and, in particular, across segments of a musical composition.

In accordance with the present systems, devices, and methods, mood labeling classifiers may advantageously be trained using mood-labeled segments of a musical composition, where such segments may be identified or defined using, for example, the systems, devices, and methods for segmentation described in U.S. patent application Ser. No. 16/775,241. Training a mood classifier using musically-coherent segments of music rather than arbitrary snippets of music can, in accordance with the present systems, devices, and methods, improve the overall consistency, reliability, and quality of the resulting mood classification. This is because, at least in part, mood generally may be less likely to change within a musical segment and more likely to change across musical segments, and arbitrary snippets of music almost always span multiple musical segments.

In some implementations, the mood tags associated with a musical composition may be used to influence a title for the musical composition (especially when such musical composition is composed or otherwise generated automatically by a computer system).

An illustrative example of the foregoing description of mood labeling is represented in FIG. 1.

FIG. 1 is a flow diagram showing an exemplary computer-implemented method 100 of training (and, optionally, employing) a mood classifier in accordance with the present systems, devices, and methods. Method 100 includes three acts 101, 102, and 103, and one optional act 104, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 101, a musical composition is automatically segmented into musical segments. Act 101 may apply the systems, devices, and/or methods described in U.S. patent application Ser. No. 16/775,241.

At 102, one or more mood label(s) is/are assigned to each musical segment. Mood label assignments at 102 may be generated automatically by a computer system, or may alternatively be provided by a human user. Human intervention at 102 may be necessary for the purposes of compiling a supervised learning data set from which an automated algorithm may learn to apply mood labels itself, where subsequent human labeling may be taken over by the computer system once training is complete.

At 103, a mood classifier is trained using the mood-labeled musical segments from 102. Training of the mood classifier may be performed using known techniques for training classifiers; however, an important element of method 100 is that the mood classifier is trained using mood-labeled musical segments as opposed to using mood-labeled arbitrary snippets of music, the latter being typical in the industry.

Where the implementation of method 100 is intended to train (i.e., produce) a mood classifier but not necessarily apply such classifier, method 100 may end or terminate at act 103. However, in implementations where method 100 is further intended to apply the resulting classifier, method 100 may include optional act 104. At 104, the mood classifier trained at 103 (based on musical segments that were defined at 101 and mood-labeled at 102) is applied to label one or more moods of a musical composition.

In accordance with the present systems, devices, and methods, segmentation of a musical composition by applying the teachings of U.S. patent application Ser. No. 16/775,241, or additionally/alternatively by converting a digital representation of the musical composition (e.g., .mid, .wav, .mp3, .mp4a, .hum, or the like) to a graphical 2D representation and then employing edge detection algorithms to identify musical segments in the graphical 2D representation by detecting (e.g., by at least one processor) edges or boundaries between adjacent musical segments in the graphical 2D representation.

In greater detail, the use of edge detection to find musical segments may proceed as follows: 1) Create a 2D graphical representation of music (encoded in .hum, .mid (MIDI), or similar symbolic music format) where the vertical axis corresponds to the pitch of the note and the horizontal axis corresponds to time. Audible note pitch values may map to integers in the range [−60, 67] inclusive. Each note may be drawn as a horizontal straight line starting at coordinate (tStart, notePitch), and ending at coordinate (tStop, notePitch) in a line color that may be, for example, chosen to be specific to each instrument. 2) Natural segment boundaries in such a 2D graphical representation of music may correspond to visually striking "implicit vertically oriented edges". However, such implicit vertically oriented edges may not be literal edges in the graphic, rather they may be formed by a multiplicity of horizontal note lines all terminating, or all beginning, at the same time. Thus, segmentation by edge detection may include inserting (literally or figuratively) actual vertical lines into the aforementioned 2D graphical representation of music at the times that sets (i.e., tuples) of notes (e.g., of cardinality greater than some threshold) start together and at the times sets of notes end together. In some implementations, the "darkness" of the lines may be made proportional to the cardinality of the sets of simultaneous starting or simultaneous ending notes. Furthermore, the "thickness" of the vertical lines may, optionally, be made greater if the color of the lines immediately before the time at which the line is inserted is generally different from the color of the lines immediately after the time at which the line is inserted. Retaining only the resulting vertical lines may expose the most natural segment boundaries, i.e., those times at which the quality of the music changes discontinuously, as the generally darker and thicker lines. Such times may be extended analytically or by using edge detection algorithms such as the "Canny algorithm" (which uses first order directional Gaussian derivatives), the "Shen-Castan algorithm" (which uses first-order derivatives of exponentials), or the "Sobel" algorithm (which is a binomial generalization of Sobel masks). Other implementations might use the implicit vertically oriented edges directly rather than first rendering them explicit.

The present systems, devices, and methods encompass, among other things: i) using a mood classifier, ii) the mood classifier itself, and iii) training the mood classifier. An exemplary method of using a mood classifier is illustrated in FIG. 2.

Figure 2:
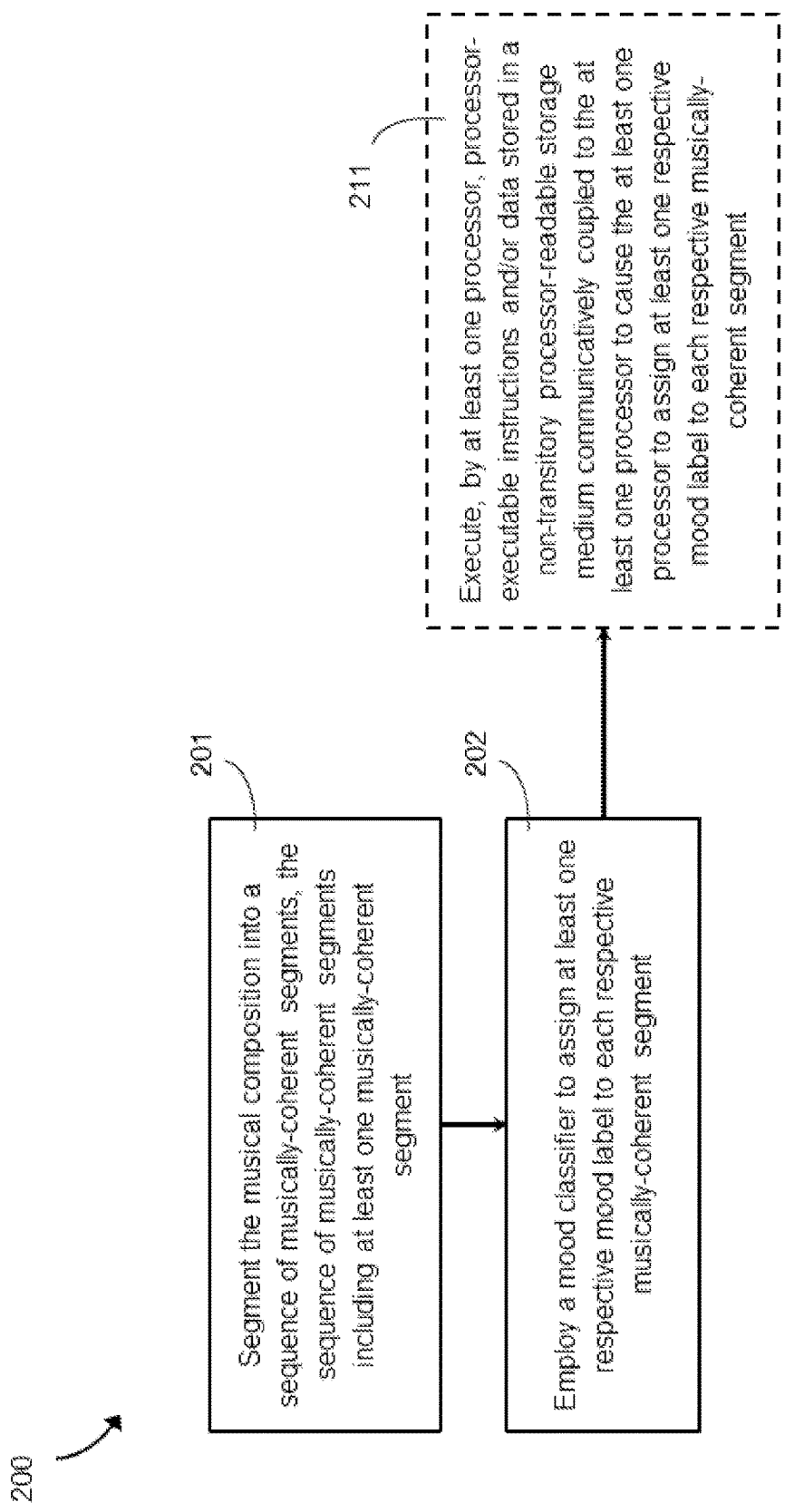
FIG. 2 is a flow diagram showing an exemplary computer-implemented method of labeling a musical composition with at least one mood label in accordance with the present systems, devices, and methods.
Figure 6:
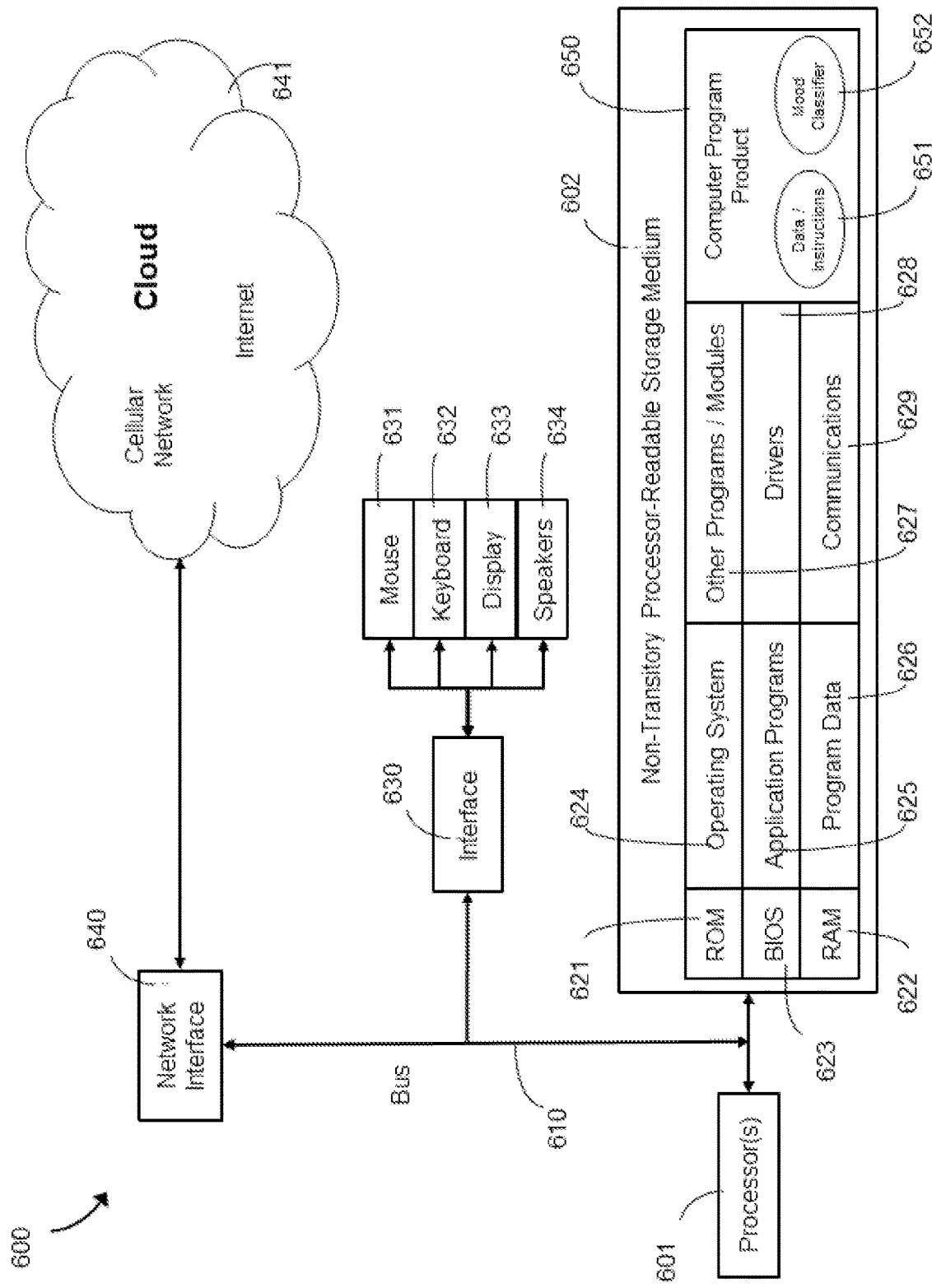
FIG. 6 is an illustrative diagram of a processor-based computer system suitable at a high level for performing the various computer-implemented methods described in the present systems, devices, and methods.

FIG. 2 is a flow diagram showing an exemplary computer-implemented method 200 of labeling a musical composition with at least one mood label in accordance with the present systems, devices, and methods. In general, throughout this specification and the appended claims, a computer-implemented method is a method in which the various acts are performed by one or more processor-based computer system(s). For example, certain acts of a computer-implemented method may be performed by at least one processor communicatively coupled to at least one non-transitory processor-readable storage medium or memory (hereinafter referred to as a non-transitory processor-readable storage medium) and, in some implementations, certain acts of a computer-implemented method may be performed by peripheral components of the computer system that are communicatively coupled to the at least one processor, such as interface devices, sensors, communications and networking hardware, and so on. The non-transitory processor-readable storage medium may store data and/or processor-executable instructions that, when executed by the at least one processor, cause the computer system to perform the method and/or cause the at least one processor to perform those acts of the method that are performed by the at least one processor. FIG. 6 and the written descriptions thereof provide illustrative examples of computer systems that are suitable to perform the computer-implemented methods described herein.

Returning to FIG. 2, method 200 includes two acts 201 and 202 and one sub-act 211, though those of skill in the art will appreciate that in alternative implementations certain acts/sub-acts may be omitted and/or additional acts/sub-acts may be added. Those of skill in the art will also appreciate that the illustrated order of the acts/sub-acts is shown for exemplary purposes only and may change in alternative implementations.

At 201, the musical composition is segmented, e.g., by at least one processor, into a sequence of musically-coherent segments. The sequence of musically-coherent segments includes at least one musically-coherent segment. For example, the sequence of musically-coherent segments may include N segments, where N is an integer and N≥2. The segmentation at 201 may invoke or apply any/all of the teachings from U.S. patent application Ser. No. 16/775,241. More specifically, at 201 at least one processor may execute processor-executable instructions and/or data stored in a non-transitory processor-readable storage medium to which the at least one processor is communicatively coupled, and the processor-executable instructions and/or data may cause the at least one processor to apply any/all teachings from U.S. patent application Ser. No. 16/775,241 in order to segment the musical composition into a sequence of musically-coherent segments. In some implementations, either instead of or in addition to applying teachings from U.S. patent application Ser. No. 16/775,241, at 201 segmenting the musical composition may include converting the musical composition into a graphical representation and employing edge detection to find segments of the graphical representation.

A musical composition may comprise any of a variety of different musically-coherent segments, including without limitation: an intro, a verse, a chorus, a solo, a middle8, a pre-chorus, a bridge, an outro, or a simply a musically-coherent portion of section of the musical composition that doesn't correspond to an established name. Thus, segmenting the musical composition at 201 may include identifying any/all of these and/or other types of musically-coherent segments in the musical composition.

At 202, a mood classifier is employed, e.g., by at least one processor, to assign at least one respective mood label to each respective musically-coherent segment from 201. Depending on the specific implementation, the mood classifier may be configured or trained to assign a variety of different mood labels. Some exemplary mood labels include, without limitation: Energetic, Heroic, Happy, Relaxed, Calm, Dreamy, Awed, Romantic, Sensual, Sexual, Wistful, Sad, Melancholic, Depressed, Anxious, Fearful, Angry, Hateful, Restless, Whimsical, Amusing, Annoying, Tense, Beautiful, Relaxing, Serene, Energizing, Erotic, Desirous, Indignant, Defiant, Joyful, Cheerful, Depressing, Scary, Fearful, and/or Triumphant. As previously described, the mood classifier may comprise processor-executable instructions and/or data stored in a non-transitory processor-readable storage medium. When executed by at least one processor communicatively coupled to the non-transitory processor-readable storage medium, the mood classifier may assign at least one mood label to at least a portion of a musical composition. To this end, act 202 of method 200 includes sub-act 211.

At 211, in order to employ a mood classifier to assign at least one respective mood label to each respective musically-coherent segment at 202, at least one processor may execute processor-executable instructions and/or data stored in a non-transitory processor-readable storage medium communicatively coupled to the at least one processor to cause the at least one processor to assign at least one respective mood label to each respective musically-coherent segment.

Figure 3:
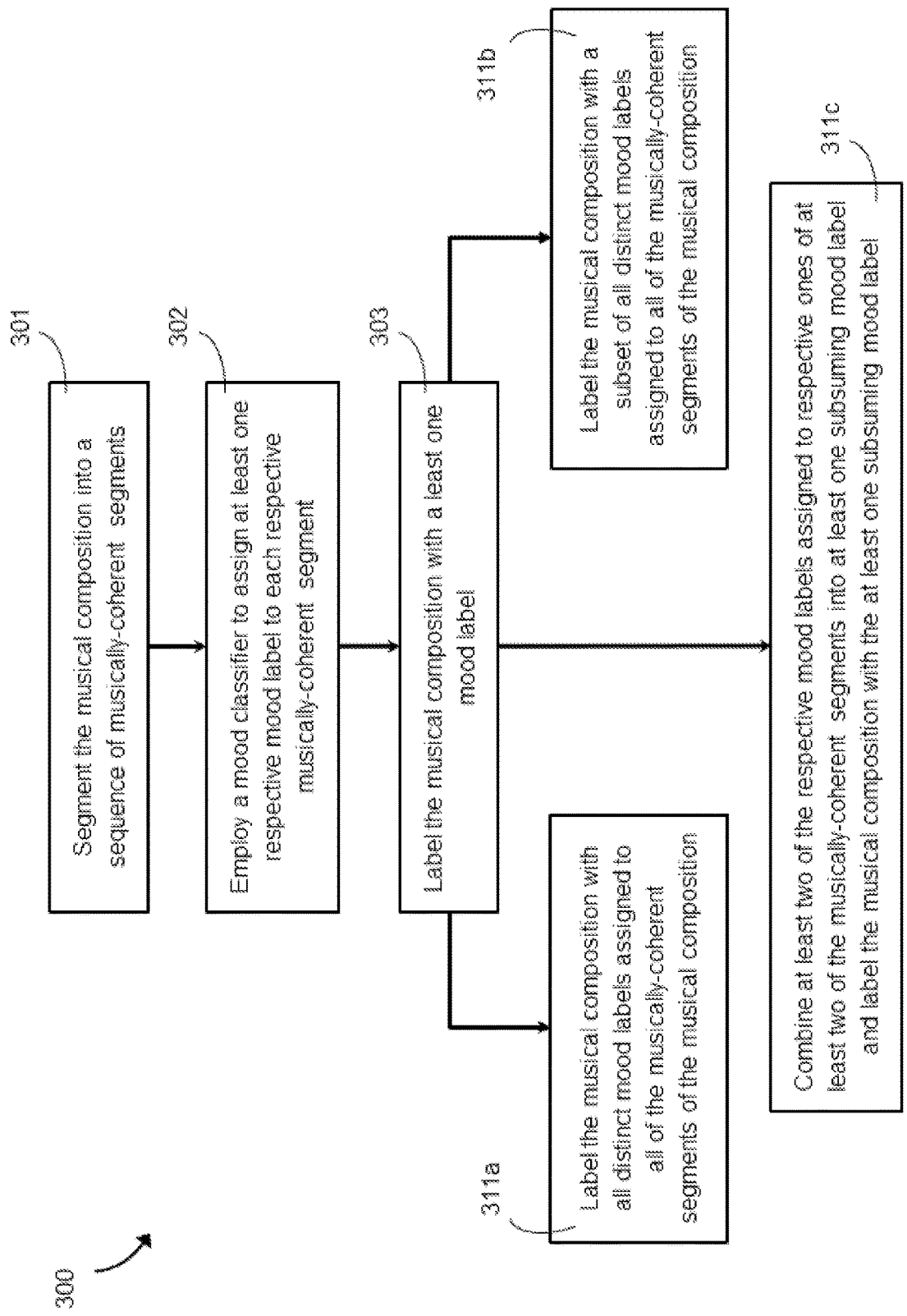
FIG. 3 is a flow diagram showing another exemplary computer-implemented method of labeling a musical composition with at least one mood label in accordance with the present systems, devices, and methods.

FIG. 3 is a flow diagram showing another exemplary computer-implemented method 300 of labeling a musical composition with at least one mood label in accordance with the present systems, devices, and methods. Method 300 includes three acts 301, 302, and 303, and each implementation of act 303 includes one of three sub-acts: either sub-act 311a, sub-act 311b, or sub-act 311c. Those of skill in the art will appreciate that in alternative implementations certain acts/sub-acts may be omitted and/or additional acts/sub-acts may be added. Those of skill in the art will also appreciate that the illustrated order of the acts/sub-acts is shown for exemplary purposes only and may change in alternative implementations.

At 301, the musical composition is segmented into a sequence of musically-coherent segments. Act 301 of method 300 is substantially similar to act 201 of method 200.

At 302, a mood classifier is employed to assign at least one respective mood label to each respective musically-coherent segment. Act 302 of method 300 is substantially similar to act 202 of method 200.

At 303, the musical composition is labeled, e.g., by at least one processor, with at least one mood label. The at least one mood label with which the musical composition is labelled at 303 may correspond to at least one mood label that was assigned to at least one musically-coherent segment of the musical composition at 302. In some implementations, labeling the musical composition with at least one mood label at 303 may include sub-act 311a, whereas in other implementations labeling the musical composition with at least one mood label at 303 may include sub-act 311b, whereas in still other implementations, labeling the musical composition with at least one mood label at 303 may include sub-act 311c.

At 311a, the musical composition is labeled, e.g., by at least one processor, with all distinct mood labels assigned to all of the musically-coherent segments of the musical composition at 302. For example, if the musical composition is segmented into N musically-coherent segments at 301, and each musically-coherent is assigned at least one distinct mood label at 302, then at 311a the musical composition may be labeled with at least N mood labels. However, in some implementations at least two musically-coherent segments of a musical composition may share a common mood label. In such implementations, only one instance of the common mood label may be applied to the musical composition at 311a. For example, if a set of four musically-coherent segments receives, at 302, the first exemplary set of four mood labels given by:

Segment 1=Happy;
Segment 2=Energetic;
Segment 3=Whimsical; and
Segment 4=Wistful then at 311a the corresponding musical composition may be labeled as [Happy, Energetic, Whimsical; Wistful], whereas if a set of four musically-coherent segments receives, at 302, the second exemplary set of four mood labels given by:

Segment 1'=Happy;
Segment 2'=Energetic;
Segment 3'=Whimsical; and
Segment 4'=Happy then at 311a the corresponding musical composition may be labeled as [Happy, Energetic, Whimsical]. In the case of the first exemplary set of four mood labels, all four mood labels are distinct (i.e., unalike from one another) and therefore at 311a the musical composition is labeled with all four mood labels [Happy, Energetic, Whimsical, Wistful]. In the case of the second exemplary set of four mood labels, only three mood labels are distinct (two are alike, or "indistinct") and therefore at 311a the musical composition is labeled with only three mood labels [Happy, Energetic, Whimsical]. In either case, at 311a the musical composition is labeled with all distinct mood labels assigned to all of the musically-coherent segments of the musical composition.

At 311b, the musical composition is labeled, e.g., by at least one processor, with a subset of all distinct mood labels assigned to all of the musically-coherent segments of the musical composition at 302. A particular example of a suitable subset of distinct mood labels with which the musical composition may be labeled at 311b is the subset consisting of only X most frequently occurring distinct mood labels among all distinct mood labels assigned to all of the musically-coherent segments of the musical composition, where X is an integer and X≥1. Returning to the second exemplary set of four mood labels [Happy, Energetic, Whimsical, Happy], the most frequently occurring distinct mood label in the second exemplary set of four mood labels is Happy. Happy occurs twice in the second exemplary set of four mood labels and no other mood label occurs two or more times in the second exemplary set of four mood labels. Therefore, for an implementation of sub-act 311b that involves the second exemplary set of four mood labels, at 311b the musical composition is labeled only as Happy.

At 311c, at least two of the respective mood labels assigned to respective ones of at least two of the musically-coherent segments are combined, e.g., by at least one processor, into at least one subsuming mood label and the musical composition is labeled, e.g., by at least one processor, with the at least one subsuming mood label. For example, related but subtly distinct mood labels, such as Dreamy and Calm, may be combined into a single subsuming label, such as Relaxing. Depending on the implementation, any number of "low-level" mood labels may be combined into a "high-level" subsuming mood label.

Throughout this specification and the appended claims, reference is often made to "employing" a mood classifier. Unless the specific context requires otherwise, employing a mood classifier generally means to apply, invoke, execute, or call upon the mood classifier to perform a specific task, such as assigning at least one respective mood label to each musically-coherent segment in a sequence of musically-coherent segments. In some implementations, to "employ" a mood classifier may simply mean to engage or otherwise cause the mood classifier to perform a task directly, in which case the mood classifier itself may assign at least one respective mood label to each musically-coherent segment in a sequence of musically-coherent segments.

In accordance with the present systems, devices, and methods, the mood classifier may comprise processor-executable instructions and/or data that are based at least in part on training data comprising a library of mood-labeled musically-coherent segments. Such training data, and such library of mood-labeled musically-coherent segments, may, for example, be amassed, collected, or developed by the process described in FIG. 4.

Figure 4:
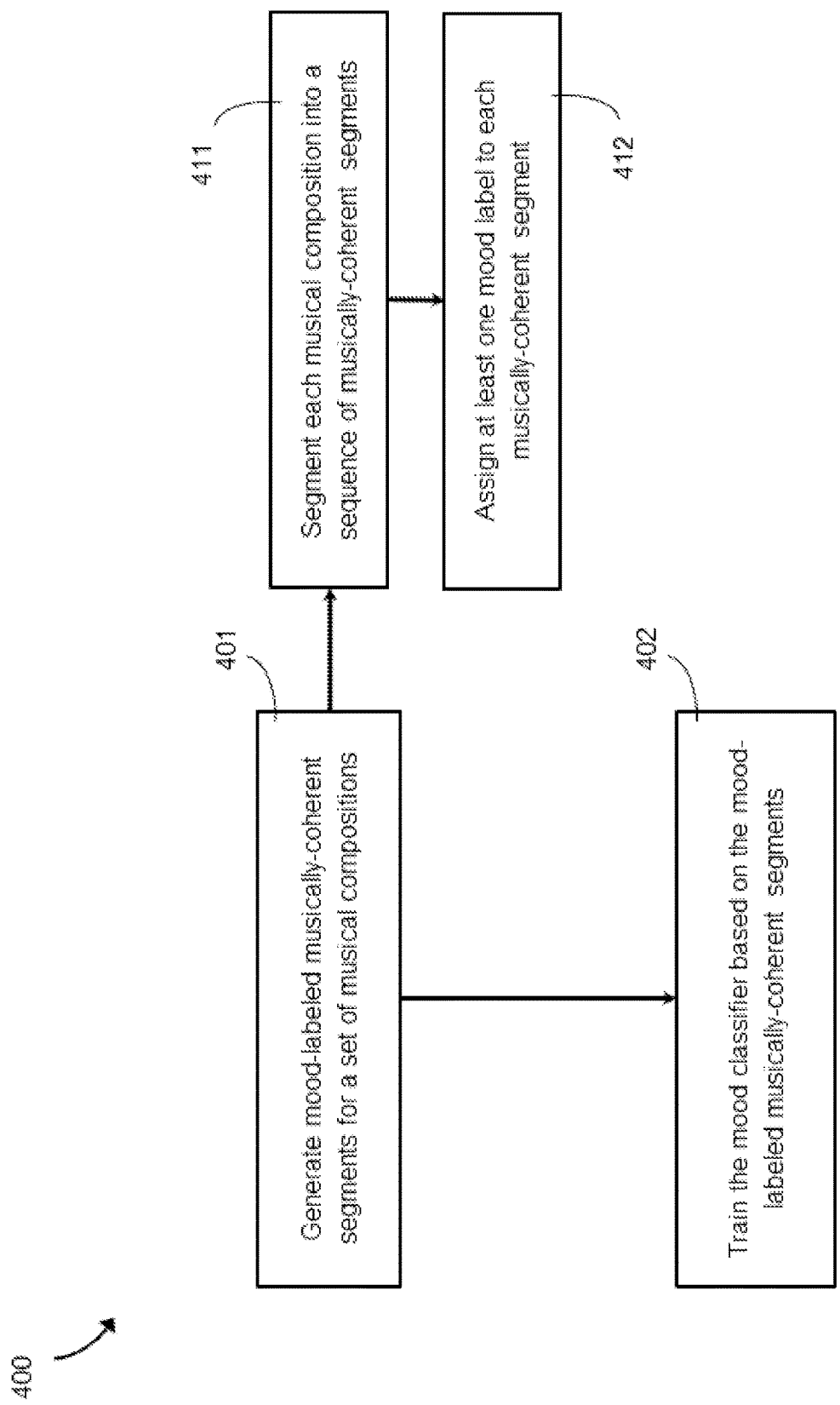
FIG. 4 is a flow diagram showing an exemplary computer-implemented method of training a mood classifier to assign at least one mood label to a musical composition in accordance with the present systems, devices, and methods.

FIG. 4 is a flow diagram showing an exemplary computer-implemented method 400 of training a mood classifier to assign at least one mood label to a musical composition in accordance with the present systems, devices, and methods. Method 400 includes two acts 401 and 402, and act 401 includes two sub-acts 411 and 412. Those of skill in the art will appreciate that in alternative implementations certain acts/sub-acts may be omitted and/or additional acts/sub-acts may be added. Those of skill in the art will also appreciate that the illustrated order of the acts/sub-acts is shown for exemplary purposes only and may change in alternative implementations.

At 401, mood-labeled musically-coherent segments are generated, e.g., by at least one processor, for a set of musical compositions. In exemplary method 400, generating mood-labeled musically-coherent segments at 401 includes a respective iteration of sub-acts 411 and 412 for each musical composition in the set of musical compositions.

At 411, each musical composition is segmented, e.g., by at least one processor, into a sequence of musically-coherent segments. Sub-act 411 of method 400 is substantially similar to act 201 of method 200 and act 301 of method 300.

At 412, at least one mood label is assigned to each musically-coherent segment. In some implementations, training a mood classifier per method 400 may advantageously employ input from a human user in order to generate a labeled training set for supervised learning. In such implementations, at least one mood label may be suggested for each musically-coherent segment by a human user and assigning at least one mood label to each musically-coherent segment at 412 may include receiving, by at least one processor, an assignment of at least one mood label for each musically-coherent segment.

At 402, the mood classifier is trained, e.g., by at least one processor, based on the mood-labeled musically-coherent segments from 401. In general, the performance accuracy of the mood classifier (i.e., the accuracy with which the trained mood classifier applies mood labels) may depend on, among other things: i) the quality of the training data generated at 401 (e.g., via sub-acts 41 and 412), and ii) the process by which the mood classifier is trained at 402.

Concerning the quality of the training data generated at 401, in some implementations of the present systems, devices, and methods it can be advantageous to ensure that each musically-coherent segment to which at least one mood label is assigned at 412 truly only conveys a single one of the moods in the library of mood labels from which the assigned mood label is selected, such that at 412 only one respective mood label is assigned to each musically-coherent segment. Assigning only one respective mood label to each musically-coherent segment at 412 can help, in each case, establish a clear mapping between the single mood conveyed by the musically-coherent segment and the corresponding mood label; however, in order to ensure that only one respective mood label can accurately be applied to each respective musically-coherent segment, some implementations of the present systems, devices, and methods may advantageously: a) employ a library of mood labels consisting of sparsely-separated mood labels such that each mood label in the library is distinct from the other mood labels in the library (e.g., Happy and Sad are quite distinct, sparsely-separated, and relatively easy to choose between if only one mood label may be assigned to a musically-coherent segment), whereas Happy and Cheery may be less distinct, less sparsely-separated, and more difficult to choose between if only one mood label may be assigned to a musically-coherent segment); and b) for training a mood classifier per method 400, employ a set of musical compositions (or a subset of musically-coherent segments extracted from the set of musical compositions) that are each particularly exhibitive or evocative of a single respective mood from the library of mood labels.

Figure 5:
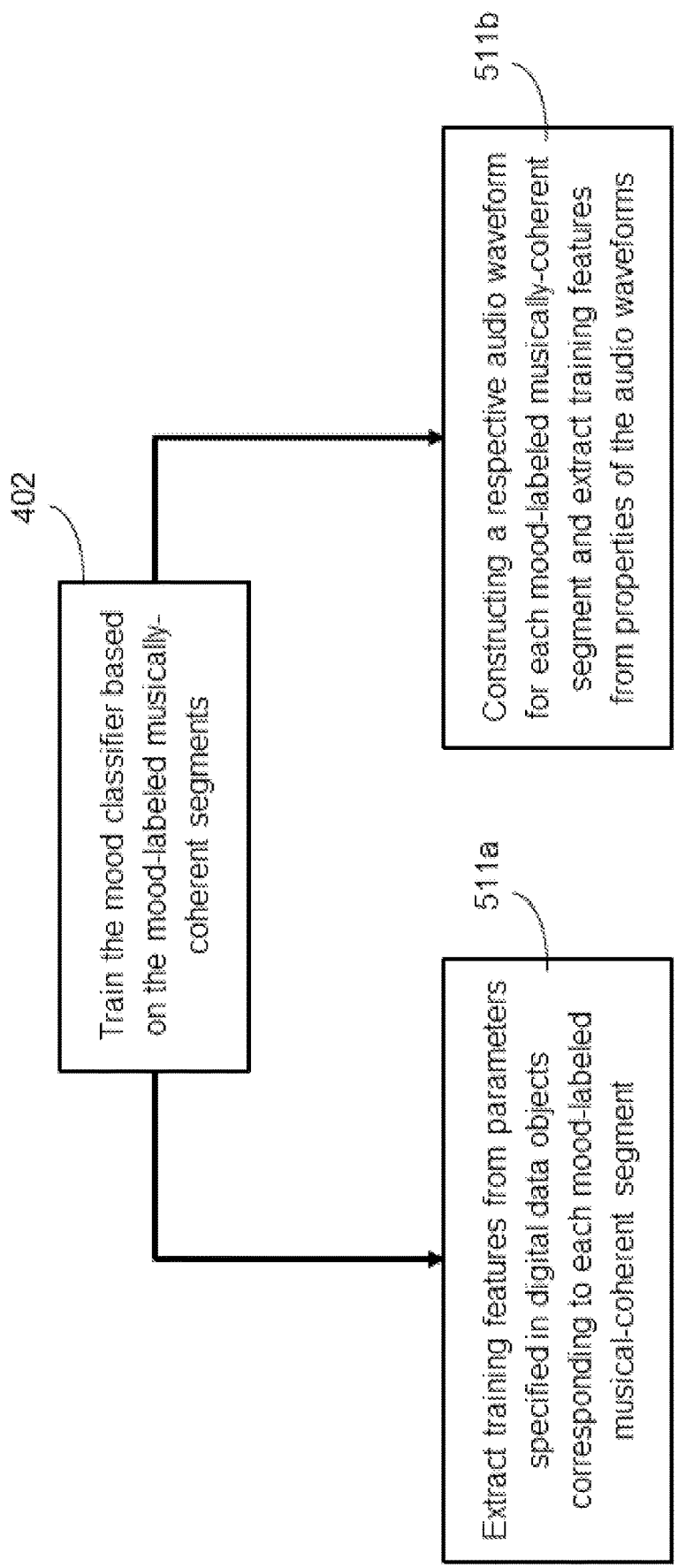
FIG. 5 is a flow diagram showing exemplary process details that may be implemented to train a mood classifier in accordance with the present systems, devices, and methods.

Concerning the process by which the mood classifier is trained at 402, exemplary suitable training processes are illustrated in FIG. 5.

FIG. 5 is a flow diagram showing exemplary process details that may be implemented to train a mood classifier per act 402 of method 400 in accordance with the present systems, devices, and methods. As previously described, at 402 a mood classifier is trained, e.g., by at least one processor, based on mood-labeled musically-coherent segments. In accordance with FIG. 5, training a mood classifier at 402 may include either or both of sub-acts 511*a* and/or 511*b* executed either selectively (i.e., one or the other) or in combination.

At 511*a*, training features are extracted, e.g., by at least one processor, from parameters specified in digital data objects corresponding to each mood-labeled musical-coherent segment. That is, per 511*a* training the mood classifier at 402 includes extracting training features from parameters specified in digital data objects corresponding to each mood-labeled musical-coherent segment. As previously described, the musical compositions used in the present systems, devices, and methods may be accessed in the form of digital media files comprising one or more digital data objects that characterize or encode the music. In accordance with the present systems, devices, and methods, music parameters that are encoded in the digital data objects may be extracted and used as training features to map to or associate with various mood labels. Exemplary parameters that may be extracted from digital representations of musical compositions at 511*a* and used as training features at 402 include, without limitation: key, scale, BPM, time signature, track type, track instrument, participation fraction, serialization, event counts, relative event counts, rescaled event counts, net duration, net relative duration, net rescaled duration, mean onset interval, rescaled onset intervals, minimum pitch, maximum pitch, weighted (by duration) mean pitch, standard deviation in pitch, maximum pitch, rescaled weighted mean pitch, energy (as in net duration x loudness), relative energy, rescaled energy, overlap fraction, reversal fraction, smoothness, and/or rescaled smoothness.

At 511*b*, a respective audio waveform is constructed, e.g., by at least one processor, for each mood-labeled musically-coherent segment and training features are extracted, e.g., by at least one processor, from properties of the audio waveforms. That is, per 511*b*, training the mood classifier at 402 includes constructing a respective audio waveform for each musically-coherent segment and extracting training features from properties of the audio waveform. Exemplary properties of each audio waveform that may be extracted at 511*b* and used as training features at 402 include, without limitation: statistical characteristics (e.g., maximum value, minimum value, minimum and maximum values, mean value, median value, standard deviation of values, maximum absolute value, minimum absolute value, minimum and maximum absolute values, sum of all values), intensity-related characteristics (e.g., mean squared values (power), root mean square of the values (RMS amplitude), and Steven's power law proxy for loudness (power^0.667)), time-domain characteristics (e.g., crest factor (maximum divided by the root mean square), entropy of values, linear prediction coefficients, peak power to average power ratio, temporal centroid of values, rate of zero crossings, number of zero crossings), frequency-domain characteristics (e.g., estimated fundamental frequency, frequencies of the formants of the signal, high frequency content (average of the linearly weighted power spectrum), mel-frequency cepstral coefficients, spectral centroid (centroid of the power spectrum), spectral crest (ratio of maximum to mean of the power spectrum), spectral flatness (geometric mean divided by the mean of the power spectrum), spectral kurtosis (kurtosis of the magnitude spectrum), spectral roll-off (frequency below which most of the energy is concentrated), spectral skewness (skewness of the magnitude spectrum), spectral slope (estimated slope of the magnitude spectrum), and spectral spread (measure of the bandwidth of the power spectrum)), and/or a voice-activity characteristic (e.g. whether there is vocals detected).

In generally, regardless of whether an implementation of act 402 of method 400 employs sub-act 511*a* or sub-act 511*b*, or both, the training features extracted in sub-act(s) 511*a*/511*b* may be used to train a mood classifier according to any of several machine learning methods (either alone or in combination) including, without limitation: decision trees, gradient boosted trees, logistic regression, naïve Bayes, nearest neighbors, neural network, random forest, and/or support vector machines.

In accordance with the present systems, devices, and methods, a mood classifier (and therefore a mood classification method) may take into additional aspects of a musical composition. For example, a mood classifier (and therefore a mood classification method) may, in addition to considering musically-coherent segments of a musical compositions, may also analyze and factor into a classification such additional aspects as: the lyrics of a song (e.g., the mood conveyed by the lyrics may be analyzed, e.g., by at least one processor, and used to influence the mood label assigned by the classifier), the performer of the musical composition (e.g., whether the performer has a particular propensity or inclination towards exhibiting a particular mood), the title of a musical composition, and/or the particular performance of a musical composition.

The various implementations described herein improve the functioning of computer systems for the specific practical application of applying mood labels to musical compositions. For example, implementing automated segmentation systems and methods to segment a musical composition into musically-coherent segments and using such musically-coherent segments for mood classification improves upon conventional mood classification approaches in at least two ways: i) in training a mood classifier, musically-coherent segments that especially exhibit or evoke certain moods can be used to ensure the mood classifier "learns" reliable and accurate mood classifications, and ii) in employing a mood classifier, musically-coherent segments generally exhibit one or more moods more clearly than the arbitrary snippets of musical compositions typically employed in the art. Overall, the present systems, devices, and methods can improve the functioning of a computer-based mood classification by producing more consistent, reliable, and accurate mood labeling to musical compositions.

The various implementations described herein often make reference to "computer-based," "computer-implemented," "at least one processor," "a non-transitory processor-readable storage medium," and similar computer-oriented terms. A person of skill in the art will appreciate that the present systems, devices, and methods may be implemented using or in association with a wide range of different hardware configurations, including localized hardware configurations (e.g., a desktop computer, laptop, smartphone, or similar) and/or distributed hardware configurations that employ hardware resources located remotely relative to one another and communicatively coupled through a network, such as a cellular network or the internet. For the purpose of illustration, exemplary computer systems suitable for implementing the present systems, devices, and methods are provided in FIG. 6.

FIG. 6 is an illustrative diagram of a processor-based computer system 600 suitable at a high level for performing the various computer-implemented methods described in the present systems, devices, and methods. Although not required, some portion of the implementations are described herein in the general context of data, processor-executable instructions or logic, such as program application modules, objects, or macros executed by one or more processors. Those skilled in the art will appreciate that the described implementations, as well as other implementations, can be practiced with various processor-based system configurations, including handheld devices, such as smartphones and tablet computers, multiprocessor systems, microprocessor-based or programmable consumer electronics, personal computers ("PCs"), network PCs, minicomputers, mainframe computers, and the like.

Processor-based computer system 600 includes at least one processor 601, a non-transitory processor-readable storage medium or "system memory" 602, and a system bus 610 that communicatively couples various system components including the system memory 602 to the processor(s) 601. Processor-based computer system 601 is at times referred to in the singular herein, but this is not intended to limit the implementations to a single system, since in certain implementations there will be more than one system or other networked computing device(s) involved. Non-limiting examples of commercially available processors include, but are not limited to: Core microprocessors from Intel Corporation, U.S.A., PowerPC microprocessor from IBM, ARM processors from a variety of manufacturers, Sparc microprocessors from Sun Microsystems, Inc., PA-RISC series microprocessors from Hewlett-Packard Company, and 68*xxx* series microprocessors from Motorola Corporation.

The processor(s) 601 of processor-based computer system 600 may be any logic processing unit, such as one or more central processing units (CPUs), microprocessors, digital signal processors (DSPs), application-specific integrated circuits (ASICs), field programmable gate arrays (FPGAs), and/or the like. Unless described otherwise, the construction and operation of the various blocks shown in FIG. 6 may be presumed to be of conventional design. As a result, such blocks need not be described in further detail herein as they will be understood by those skilled in the relevant art.

The system bus 610 in the processor-based computer system 600 may employ any known bus structures or architectures, including a memory bus with memory controller, a peripheral bus, and/or a local bus. The system memory 602 includes read-only memory ("ROM") 621 and random access memory ("RAM") 622. A basic input/output system ("BIOS") 623, which may or may not form part of the ROM 621, may contain basic routines that help transfer information between elements within processor-based computer system 600, such as during start-up. Some implementations may employ separate buses for data, instructions and power.

Processor-based computer system 600 (e.g., system memory 602 thereof) may include one or more solid state memories, for instance, a Flash memory or solid state drive (SSD), which provides nonvolatile storage of processor-executable instructions, data structures, program modules and other data for processor-based computer system 600. Although not illustrated in FIG. 6, processor-based computer system 600 may, in alternative implementations, employ other non-transitory computer- or processor-readable storage media, for example, a hard disk drive, an optical disk drive, or a memory card media drive.

Program modules in processor-based computer system 600 may be stored in system memory 602, such as an operating system 624, one or more application programs 625, program data 626, other programs or modules 627, and drivers 628.

The system memory 602 in processor-based computer system 600 may also include one or more communications program(s) 629, for example, a server and/or a Web client or browser for permitting processor-based computer system 600 to access and exchange data with other systems such as user computing systems, Web sites on the Internet, corporate intranets, or other networks as described below. The communications program(s) 629 in the depicted implementation may be markup language based, such as Hypertext Markup Language (HTML), Extensible Markup Language (XML) or Wireless Markup Language (WML), and may operate with markup languages that use syntactically delimited characters added to the data of a document to represent the structure of the document. A number of servers and/or Web clients or browsers are commercially available such as those from Google (Chrome), Mozilla (Firefox), Apple (Safari), and Microsoft (Internet Explorer).

While shown in FIG. 6 as being stored locally in system memory 602, operating system 624, application programs 625, program data 626, other programs/modules 627, drivers 628, and communication program(s) 629 may be stored and accessed remotely through a communication network or stored on any other of a large variety of non-transitory processor-readable media (e.g., hard disk drive, optical disk drive, SSD and/or flash memory).

Processor-based computer system 600 may include one or more interface(s) to enable and provide interactions with a user, peripheral device(s), and/or one or more additional processor-based computer system(s). As an example, processor-based computer system 610 includes interface 630 to enable and provide interactions with a user of processor-based computer system 600. A user of processor-based computer system 600 may enter commands, instructions, data, and/or information via, for example, input devices such as computer mouse 631 and keyboard 632. Other input devices may include a microphone, joystick, touch screen, game pad, tablet, scanner, biometric scanning device, wearable input device, and the like. These and other input devices (i.e., "I/O devices") are communicatively coupled to processor(s) 601 through interface 630, which may include one or more universal serial bus ("USB") interface(s) that communicatively couples user input to the system bus 610, although other interfaces such as a parallel port, a game port or a wireless interface or a serial port may be used. A user of processor-based computer system 600 may also receive information output by processor-based computer system 600 through interface 630, such as visual information displayed by a display 633 and/or audio information output by one or more speaker(s) 634. Monitor 633 may, in some implementations, include a touch screen.

As another example of an interface, processor-based computer system 600 includes network interface 640 to enable processor-based computer system 600 to operate in a networked environment using one or more of the logical connections to communicate with one or more remote computers, servers and/or devices (collectively, the "Cloud" 641) via one or more communications channels. These logical connections may facilitate any known method of permitting computers to communicate, such as through one or more LANs and/or WANs, such as the Internet, and/or cellular communications networks. Such networking environments are well known in wired and wireless enterprisewide computer networks, intranets, extranets, the Internet, and other types of communication networks including telecommunications networks, cellular networks, paging networks, and other mobile networks.

When used in a networking environment, network interface 640 may include one or more wired or wireless communications interfaces, such as network interface controllers, cellular radios, WI-FI radios, and/or Bluetooth radios for establishing communications with the Cloud 641, for instance, the Internet or a cellular network.

In a networked environment, program modules, application programs or data, or portions thereof, can be stored in a server computing system (not shown). Those skilled in the relevant art will recognize that the network connections shown in FIG. 6 are only some examples of ways of establishing communications between computers, and other connections may be used, including wirelessly.

For convenience, processor(s) 601, system memory 602, interface 630, and network interface 640 are illustrated as communicatively coupled to each other via the system bus 610, thereby providing connectivity between the above-described components. In alternative implementations, the above-described components may be communicatively coupled in a different manner than illustrated in FIG. 6. For example, one or more of the above-described components may be directly coupled to other components, or may be coupled to each other via intermediary components (not shown). In some implementations, system bus 610 may be omitted with the components all coupled directly to each other using suitable connections.

In accordance with the present systems, devices, and methods, processor-based computer system 600 may be used to implement or in association with any or all of methods 100, 200, 300, and/or 400 described herein and/or to define, encode, and/or manipulate any or all of the data objects, musical compositions, musical segments, mood labels, and/or mood classifiers described herein. Where the descriptions of methods 100, 200, 300, and 400 make reference to an act or sub-act being performed by at least one processor, such act or sub-act may be performed by processor(s) 601 of computer system 600. Where the descriptions of methods 100, 200, 300, and 400 make reference an act or sub-act being performed by, performed on, or otherwise involving a non-transitory processor-readable storage medium, such act or sub-act may be performed by, performed on, or otherwise involve system memory 602 of computer system 600.

Computer system 600 is an illustrative example of a system for performing all or portions of the various methods described herein, the system comprising at least one processor 601, at least one non-transitory processor-readable storage medium 602 communicatively coupled to the at least one processor 601 (e.g., by system bus 610), and the various other hardware and software components illustrated in FIG. 6 (e.g., operating system 624, mouse 631, etc.). In particular, in order to enable system 600 to implement the present systems, devices, and methods, system memory 602 stores a computer program product 650 comprising processor-executable instructions and/or data 651 that, when executed by processor(s) 601, cause processor(s) 601 to perform the various processor-based acts of methods 100, 200, 300, and/or 400 as described herein. To that end, computer program product 650 also stores at least one mood classifier 652 that may itself comprise processor-executable instructions and/or data that is/are invoked or employed by processor 601 whenever a mood classifier is called upon or employed by the present systems, devices, and methods. In some implementations, computer system 600 may be used to train mood classifier 652 in accordance with method 100 and/or 400 and then computer system 600 may execute, employ, or utilize mood classifier 652 in performing any/all of methods 100, 200, and/or 300.

Throughout this specification and the appended claims, the term "computer program product" is used to refer to a package, combination, or collection of software comprising processor-executable instructions and/or data that may be accessed by (e.g., through a network such as cloud 641) or distributed to and installed on (e.g., stored in a local non-transitory processor-readable storage medium such as system memory 602) a computer system (e.g., computer system 600) in order to enable certain functionality (e.g., application(s), program(s), and/or module(s)) to be executed, performed, or carried out by the computer system.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, unless the specific context requires otherwise the term "note" is generally used to refer to a musical note (such as Ab, A, A #, Bb, B, C, C #, Db, D, D #, Eb, E, F, F #, Gb, G, G #(of any octave), and theoretical notes such as Cb, which is enharmonic to B) and is inclusive of rests (i.e., a note with a certain timing but no pitch or volume). A person of skill in the art will appreciate that the "parameters" of a note, or "note parameters," may include any or all concepts used to characterize notes in modern musical theory, including without limitation: pitch, start time, stop time, duration, volume, attack, reverb, decay, sustain, and instrument (e.g., tone, timbre, relative harmonics, and the like). Thus, a "note data object" is a data object that encodes a note, including its applicable note parameters.

A musical composition may include percussion events that have no tonal pitch but are used to impart rhythm. Throughout this specification and the appended claims, unless the specific context requires otherwise the term "note" is inclusive of percussion events. A percussion event may be defined or characterized by note parameters that generally do not include a pitch and generally specify a percussion instrument as the instrument.

Throughout this specification and the appended claims, reference is often made to a "track." Unless the specific context requires otherwise, the term track is used herein to refer to a collection or sequence of notes that are all "played by" the same instrument in a musical composition. For example, a musical composition that is for or by a single instrument may have only one track, but a musical composition that is for or by multiple instruments concurrently may have multiple tracks that are temporally overlaid on one another. Each respective bar of a musical composition may include multiple tracks, where each track provides the sequence of notes of a respective instrument throughout the duration of that bar.

Throughout this specification and the appended claims, unless the specific context requires otherwise the term "bar" is generally used to refer to a musical bar; i.e., a portion of time comprising a set number of beats from a musical composition. The number of beats in a bar depends on the time signature for the musical composition. A person of skill in the art will appreciate that the "parameters" of a bar, or "bar parameters," may include any or all concepts used to characterize bars in modern musical theory, including without limitation: bar index, time signature, beats per minute, duration, start time, stop time, beat times, key, scale, chords, tracks, sequence of notes, and (if applicable) sequence of percussion events.

Throughout this specification and the appended claims, the term "first" and related similar terms, such as "second," "third," and the like, are often used to identify or distinguish one element or object from other elements or objects (as in, for example, "first note" and "first bar"). Unless the specific context requires otherwise, such uses of the term "first," and related similar terms such as "second," "third," and the like, should be construed only as distinguishing identifiers and not construed as indicating any particular order, sequence, chronology, or priority for the corresponding element(s) or object(s). For example, unless the specific context requires otherwise, the term "first note" simply refers to one particular note among other notes and does not necessarily require that such one particular note be positioned ahead of or before any other note in a sequence of notes; thus, a "first note" of a musical composition or bar is one particular note from the musical composition or bar and not necessarily the lead or chronologically-first note of the musical composition or bar.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A computer-implemented method of labeling a musical composition with at least one mood label, the method comprising:
   segmenting the musical composition into a sequence of non-uniform musically-coherent segments based on a sound of the musical composition, the sequence of musically-coherent segments including at least two musically-coherent segments selected from a group consisting of: an intro, a verse, a chorus, a solo, a middle8, a pre-chorus, a bridge, and an outro; and
   employing a mood classifier to automatically assign at least one respective mood label to each respective musically-coherent segment.

2. The method of claim 1 wherein the mood classifier comprises processor-executable instructions and/or data stored in a non-transitory processor-readable storage medium that, when executed by at least one processor, cause the at least one processor to assign the at least one respective mood label to each respective musically-coherent segment of the musical composition, and wherein employing the mood classifier to automatically assign the at least one respective mood label to each respective musically-coherent segment includes executing, by the at least one processor, the processor-executable instructions and/or data stored in the non-transitory processor-readable storage medium communicatively coupled to the at least one processor to cause the at least one processor to assign the at least one respective mood label to each respective musically-coherent segment.

3. The method of claim 1 wherein the mood classifier comprises processor-executable instructions and/or data stored in a non-transitory processor-readable storage medium, wherein the processor-executable instructions and/or data are based at least in part on training data comprising a library of mood-labeled musically-coherent segments.

4. The method of claim 1, further comprising:
labelling the musical composition with at least one additional mood label, the at least one additional mood label with which the musical composition is labelled corresponding to at least one of the mood labels assigned to at least one musically-coherent segment of the musical composition.

5. The method of claim 4 wherein labeling the musical composition with at least one additional mood label includes labeling the musical composition with all distinct mood labels assigned to all of the musically-coherent segments of the musical composition.

6. The method of claim 4 wherein labeling the musical composition with at least one additional mood label includes labeling the musical composition with a subset of all distinct mood labels assigned to all of the musically-coherent segments of the musical composition, the subset consisting of only X most frequently occurring distinct mood labels among all distinct mood labels assigned to all of the musically-coherent segments of the musical composition, where X is an integer and X≥1.

7. The method of claim 4 wherein labeling the musical composition with at least one additional mood label includes combining at least two of the respective mood labels assigned to respective ones of at least two of the musically-coherent segments into at least one subsuming mood label and labelling the musical composition with the at least one subsuming mood label.

8. The method of claim 1 wherein:
employing a mood classifier to automatically assign at least one respective mood label to each respective musically-coherent segment includes employing the mood classifier to automatically assign, to at least one musically-coherent segment, at least one mood label selected from a group consisting of: Energetic, Heroic, Happy, Relaxed, Calm, Dreamy, Awed, Romantic, Sensual, Sexual, Wistful, Sad, Melancholic, Depressed, Anxious, Fearful, Angry, Hateful, Restless, Whimsical, Amusing, Annoying, Tense, Beautiful, Relaxing, Serene, Energizing, Erotic, Desirous, Indignant, Defiant, Joyful, Cheerful, Depressing, Scary, Fearful, and Triumphant.

9. A mood classifier comprising;
processor-executable instructions and/or data stored in a non-transitory processor-readable storage medium, wherein when executed by at least one processor communicatively coupled to the non-transitory processor-readable storage medium, the mood classifier;
segments a musical composition into a sequence of non-uniform musically-coherent segments based on a sound of the musical composition, the sequence of musically-coherent segments including at least two musically-coherent segments selected from a group consisting of: an intro, a verse, a chorus, a solo, a middle8, a pre-chorus, a bridge, and an outro; and
automatically assigns at least one respective mood label to each respective musically-coherent segment wherein the processor-executable instructions and/or data are based at least in part on training data comprising a library of mood-labeled musically-coherent segments.

10. The mood classifier of claim 9 wherein the library of mood-labeled musically-coherent segments is generated from a library of musical compositions by a process that, for each musical composition in the library of musical compositions:
segments the musical composition into musically-coherent segments; and
assigns at least one mood label to each musically-coherent segment.

11. The mood classifier of claim 10 wherein the library of mood-labeled musically-coherent segments is generated from a library of musical compositions by a process that, for each musical composition in the library of musical compositions:
segments the musical composition into musically-coherent segments; and
assigns only one respective mood label to each musically-coherent segment.

12. The mood classifier of claim 9 wherein the at least one mood label is selected from a group consisting of: Energetic, Heroic, Happy, Relaxed, Calm, Dreamy, Awed, Romantic, Sensual, Sexual, Wistful, Sad, Melancholic, Depressed, Anxious, Fearful, Angry, Hateful, Restless, Whimsical, Amusing, Annoying, Tense, Beautiful, Relaxing, Serene, Energizing, Erotic, Desirous, Indignant, Defiant, Joyful, Cheerful, Depressing, Scary, Fearful, and Triumphant.

13. A computer-implemented method of training a mood classifier to automatically assign at least one mood label to a musical composition, the method comprising:
generating mood-labeled musically-coherent segments, wherein generating mood-labeled musically-coherent segments includes, for a set of musical compositions:
segmenting each musical composition into a sequence of non-uniform musically-coherent segments based on a sound of the musical composition, the sequence of musically-coherent segments including at least two musically-coherent segments selected from a group consisting of: an intro, a verse, a chorus, a solo, a middle8, a pre-chorus, a bridge, and an outro; and
assigning at least one mood label to each musically-coherent segment;
and
training the mood classifier based on the mood-labeled musically-coherent segments.

14. The method of claim 13 wherein assigning at least one mood label to each musically-coherent segment includes receiving, by at least one processor, an assignment of at least one respective mood label for each respective musically-coherent segment.

15. The method of claim 13 wherein assigning at least one mood label to each musically-coherent segment includes assigning only one respective mood label to each musically-coherent segment.

16. The method of claim 13 wherein:
assigning at least one mood label to each musically-coherent segment includes assigning, to each musically-coherent segment, at least one mood label selected from a group consisting of: Energetic, Heroic, Happy, Relaxed, Calm, Dreamy, Awed, Romantic, Sensual, Sexual, Wistful, Sad, Melancholic, Depressed, Anxious, Fearful, Angry, Hateful, Restless, Whimsical, Amusing, Annoying, Tense, Beautiful, Relaxing, Serene, Energizing, Erotic, Desirous, Indignant, Defiant, Joyful, Cheerful, Depressing, Scary, Fearful, and Triumphant.

17. The method of claim 13 wherein each mood-labeled musically-coherent segment comprises a respective set of digital data objects, and wherein training the mood classifier based on the mood-labeled musically-coherent segments includes extracting training features from parameters specified in the digital data objects.

18. The method of claim 13 wherein training the mood classifier based on the mood-labeled musically-coherent segments includes, for each mood-labeled musically-coherent segment, constructing a respective audio waveform and extracting training features from properties of the audio waveform.

* * * * *